(12) United States Patent
Baghdadi

(10) Patent No.: US 6,402,161 B1
(45) Date of Patent: Jun. 11, 2002

(54) PORTABLE STAIR-CLIMBING LOAD TRANSPORTING DOLLY

(76) Inventor: George Baghdadi, 24 Barrington Crescent, Markham, Ontario (CA), L3R 3H3

( * ) Notice: Subject to any disclaimer, the term of this patent is extended or adjusted under 35 U.S.C. 154(b) by 0 days.

(21) Appl. No.: 09/773,133

(22) Filed: Feb. 1, 2001

(51) Int. Cl.[7] ................................................. B62B 5/02
(52) U.S. Cl. ....................... 280/5.2; 280/47.27; 180/8.2; 305/5
(58) Field of Search ........................... 180/8.1, 8.2, 8.3, 180/8.4, 8.5, 8.6, 8.7; 280/5.2, 5.22, 5.24, 5.26, 5.28, 5.3, 5.32, 47.27, 47.17, 47.19; 305/1, 4, 5

(56) References Cited

U.S. PATENT DOCUMENTS

| | | | | |
|---|---|---|---|---|
| 255,693 A | * | 3/1882 | Tauber | 280/5.2 |
| 1,551,127 A | * | 8/1925 | Whyel | 280/47.27 |
| 1,987,314 A | * | 1/1935 | Turner | 305/5 |
| 3,411,599 A | * | 11/1968 | Kahlmorgan et al. | 180/8.1 |
| 3,494,440 A | * | 2/1970 | Hanson | 180/8.1 |
| 4,142,732 A | * | 3/1979 | Boyd | 280/5.26 |
| 4,200,161 A | * | 4/1980 | Penington, Jr. | 180/8.2 |
| 4,387,891 A | * | 6/1983 | Knochel | 482/68 |
| 4,723,757 A | * | 2/1988 | Steinman et al. | 254/369 |
| 4,760,653 A | * | 8/1988 | Baggio | 36/118.9 |
| 5,833,249 A | * | 11/1998 | DeMartino | 280/5.2 |

FOREIGN PATENT DOCUMENTS

| | | | |
|---|---|---|---|
| FR | 2601292 | * | 1/1988 |
| FR | 2620978 | * | 3/1989 |
| GB | 111713 | * | 12/1917 |

* cited by examiner

Primary Examiner—Brian L. Johnson
Assistant Examiner—Bryan Fischmann
(74) Attorney, Agent, or Firm—David W. Wong

(57) ABSTRACT

A portable load transporting dolly having a mechanism manually operable for selectively ascending or descending steps is shown. The dolly has generally cross-shaped wheels and a pivotal driving lever is located at its handle. A cable couples the pivotal driving lever to the rotating shaft of the cross-shaped wheels through a plurality of pulleys and ratchet gears such that the wheels may be rotated easily by gripping the lever. The radial arms of the cross-shaped wheels have sliding reciprocative rods which react with the steps of the staircase to enhance the climbing action of the dolly on the staircase.

6 Claims, 3 Drawing Sheets

US 6,402,161 B1

PORTABLE STAIR-CLIMBING LOAD TRANSPORTING DOLLY

FIELD OF INVENTION

This invention relates to a portable dolly operable manually by a single person for safely transporting a relatively heavy load up or down various staircases having steps of different heights and depths.

BACK GROUND OF THE INVENTION

A portable dolly is commonly used for transporting a heavy load such as furniture or a large appliance. The dolly is provided with rotary wheels and the load is mounted or rested securely on a support shelf on the dolly so that the load may be transported by simply wheeling the dolly from one location to another location on a ground or a floor. However, it has been problematic to move a heavy load up or down a staircase, since it is not possible to push the dolly up the steps of the staircase and it is very hazardous to attempt to push the dolly down the steps in such instances since it would drop from one step to a lower step. The drop could cause damage to the dolly and the load and also the dolly could continue to roll down the steps uncontrollably due to the falling momentum. Therefore, it is necessary that the dolly with the load resting thereon must be lifted and carried up or down the staircase. Such operation is difficult, if not impossible in most instances, for one person to carry out.

There are some dollies such as that shown in U.S. Pat. No. 2,633,363 issued to J. M. Marshall on Mar. 31, 1953 and U.S. Pat. No. 3,698,501 issued to E. S. Gross on Oct. 17, 1972 which are provided with a star-shaped rotary support having wheels mounted at its corners. The rotary support is rotatable to position the neighboring wheels at its corners on consecutive steps of a staircase such that the dolly may be pushed up or down the staircase. In both these devices, the above stated problem of the dolly continuing to roll down the steps by momentum still exists, and the dolly would still roll down the steps by the wheels of the star-shaped rotary support. Furthermore, the Gross device has an electric motor incorporated therein, which can be energized to drive the star-shaped rotary support. Such dolly is rather complex in structure and the motor and the associated driving gear mechanism would invariably increase the weight of the device such that it would be difficult to handle by a single person. Moreover, since the electric motor must be connected to a nearby electrical supply with a power cable for its operation; it is awkward to use or is useless if no power supply outlet is close by. Also, the star-shaped rotary support in both devices shown in these patents has a fixed size so that it can only operate on a staircase having steps of a predetermined height and depth.

SUMMARY OF THE INVENTION

It is a primary object of the present invention to provide a manually operable dolly which is operable for transporting a load up or down a staircase with ease in a controlled manner.

It is another object of the present invention to provide a dolly which is operable on various staircases having steps of different heights and depths.

It is another object of the present invention to provide a dolly having a relatively light weight and may be operated by a single person.

It is still another object of the present invention to provide a dolly having a simply construction and is easy to operate.

BRIEF DESCRIPTION OF THE DRAWINGS

Other objects and advantages of the present invention will become apparent from the following detailed description of the preferred embodiments thereof in connection with the accompanying drawings, in which.

DETAILED DESCRIPTION OF THE PREFERRED EMBODIMENTS

Figure 1:
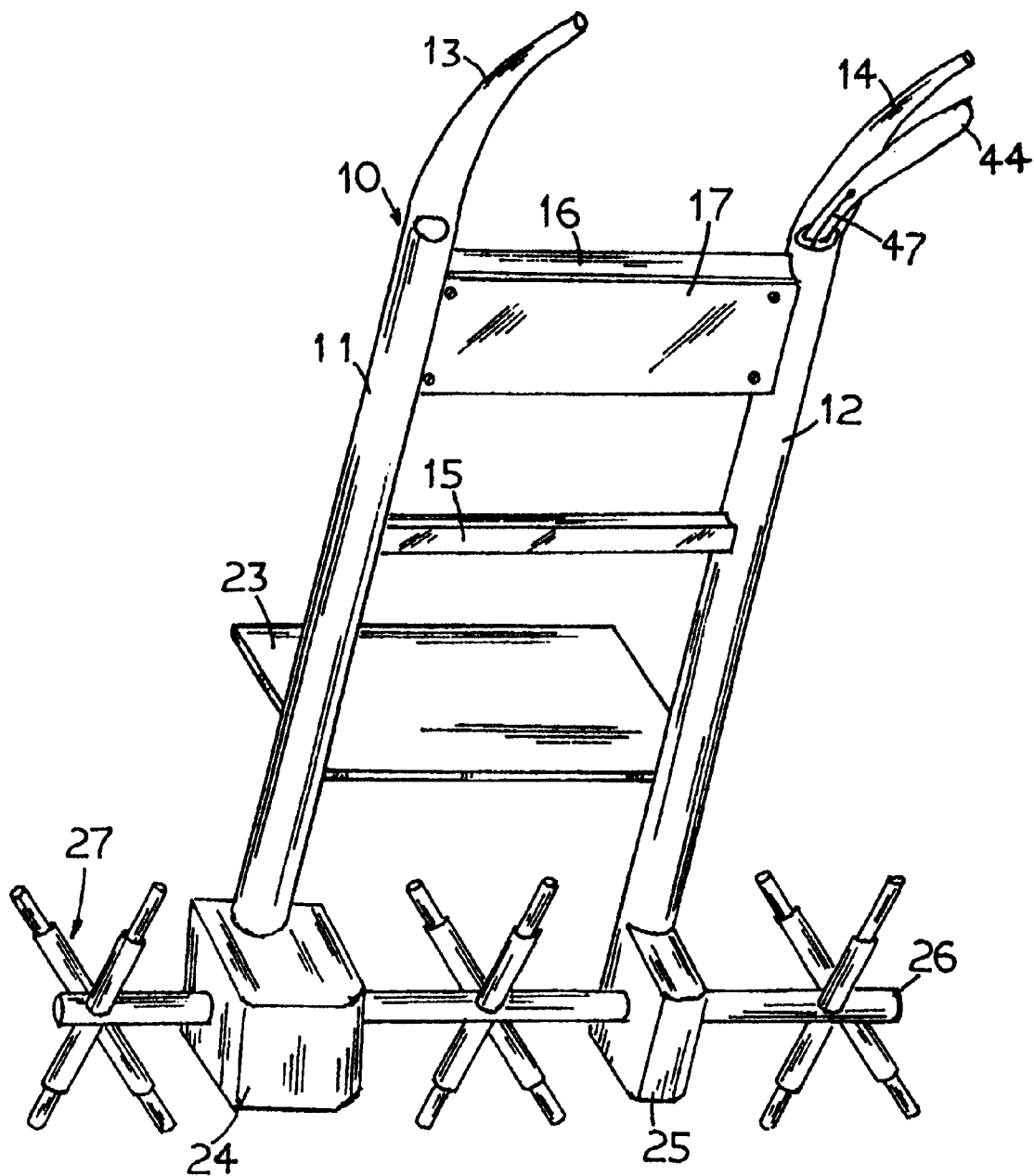
FIG. 1 is a perspective rear elevation view of the manually operable dolly according to the present invention.
Figure 2:
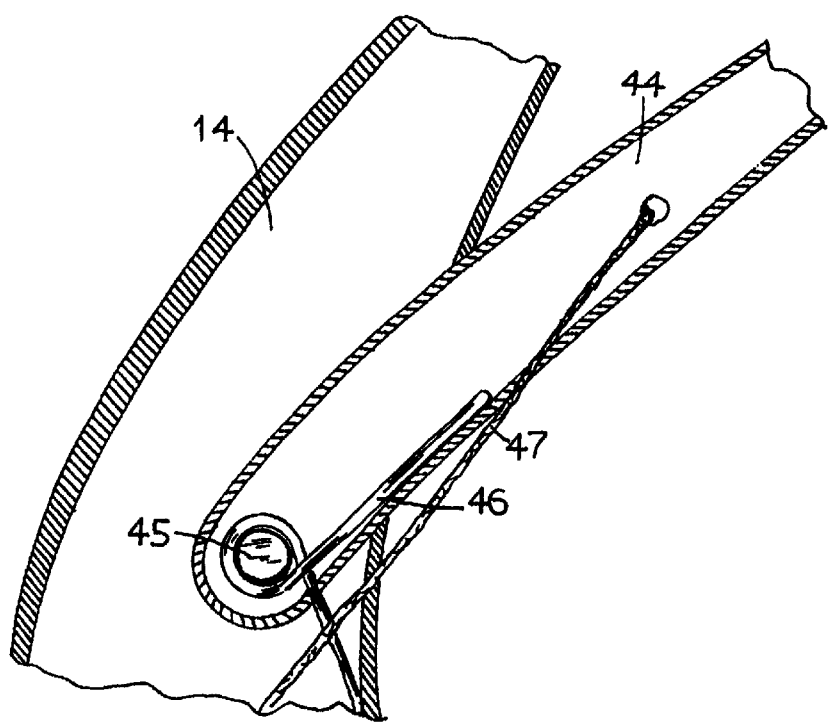
FIG. 2 is an isolated enlarged partial sectional side view of the pivotal lever operable for moving the dolly of the present invention.
Figure 3:
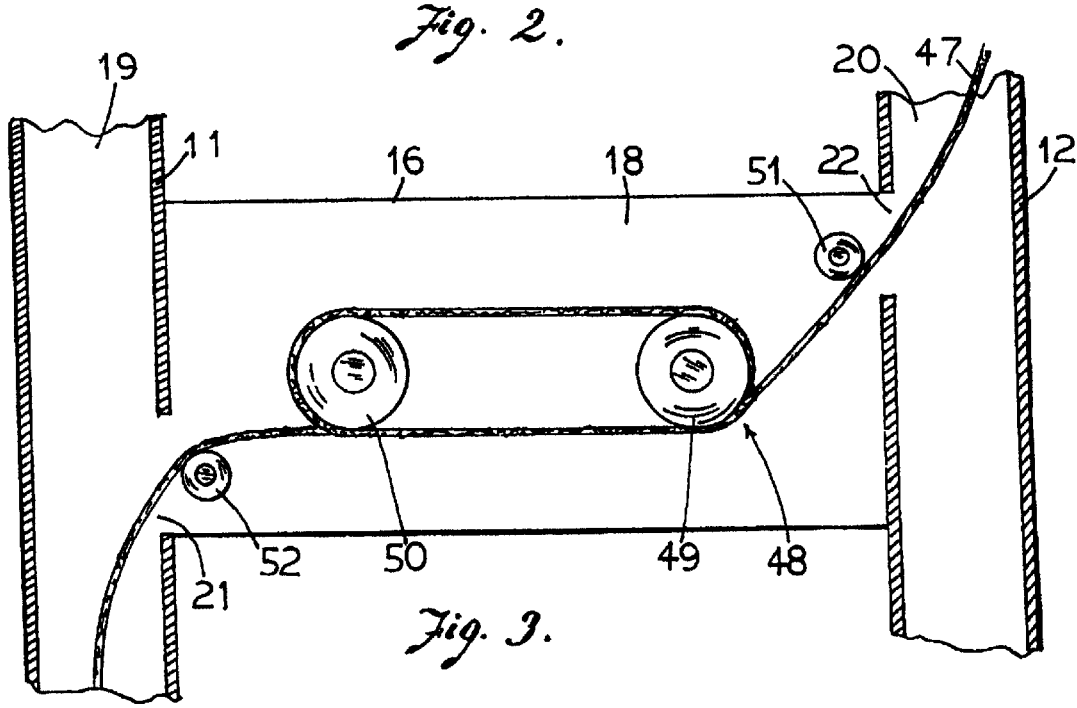
FIG. 3 is an isolated enlarged partial section view of the pulley system for coupling the cable to the drive shaft of the dolly.

With reference to the drawings in which like reference numerals designate corresponding parts in the several views, the portable dolly 10 of the present invention has a main frame consisting of two elongated mutually parallel tubular support columns 11 and 12. Two curved handles 13 and 14 are located at the upper ends of the support columns 11 and 12 respectively and curving slightly rearwardly to facilitate the ease of handling the dolly 10. The support columns 11 and 12 are mounted together by one or a plurality of horizontal cross brace 15. One cross braces 15 is shown in FIG. 1 for ease of illustration. A rectangular pulley housing 16 is also provided between the support columns 11 and 12 and preferably located just below the handles 13 and 14. The pulley housing 16 is provided with a cover 17 either provided on the front or the back therein; a rear cover is shown as an example. The interior compartment 18 of the pulley housing 16 is in communication with the interior channels 19 and 20 of the support columns 11 and 12 respectively through openings 21 and 22. A load support shelf 23 extends horizontally outwards at the front of the dolly 10 and is adapted for supporting the load which may be additionally secured to the support columns 11 and 12 by restraining straps in a conventional manner. A driving gear housing 24 is provided at the lower end of the support column 11 and a bearing housing 25 is provided at the lower end of the support column 12. The driving gear housing 24 and the bearing housing 25 extend rearwardly relative to the support columns 11 and 12. A hollow rotary shaft 26 extends horizontally through the driving gear housing 24 and bearing housing 25. Ratchet driving gears are provided in the driving gear housing 24 which are operable for rotating the rotary shaft 26.

Figure 4:
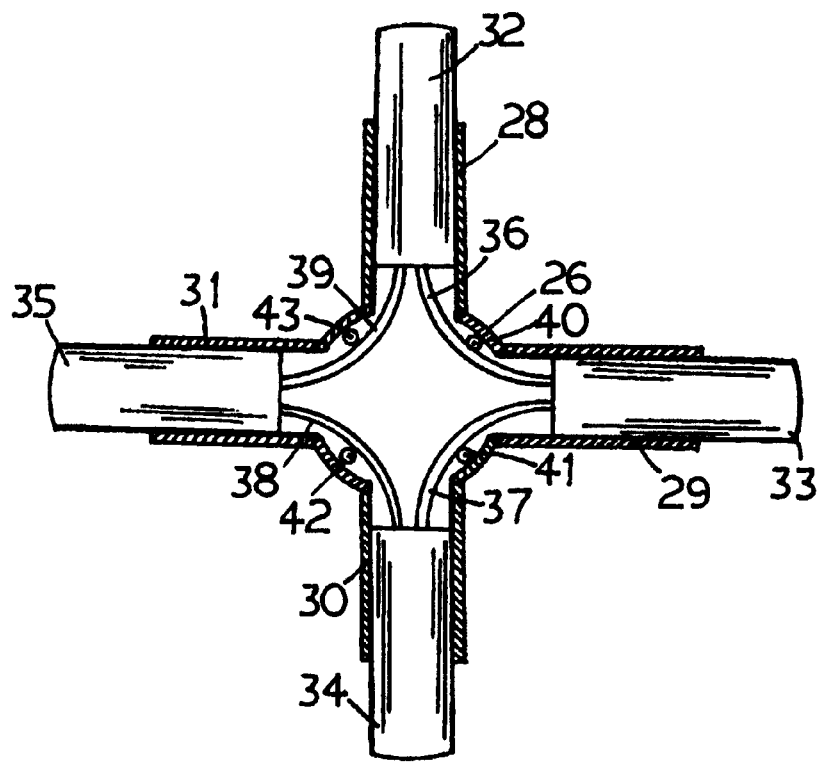
FIG. 4 is an isolated enlarged partial sectional view of the cross-shaped wheel of the dolly of the present invention showing the reciprocative sliding rods.

Three cross-shaped drive wheels 27 are provided on the rotary shaft 26. Each drive wheel 27 consists of four sleeves 28, 29, 30 and 31 mounted perpendicular to the rotary shaft 26 and are positioned 90 degrees from the neighboring sleeves. Elongated sliding rods 32, 33, 34 and 35 are slidably located within the sleeves 28, 29, 30 and 31 respectively. The inner ends of the sliding rods 32, 33, 34 and 35 are coupled to one another by elongated bendable push rods 36, 37, 38 and 39 as best shown in FIG. 4 such that retraction of any one sliding rod would cause the adjacent pair of the sliding rods located 90 degrees to it to extend outwards; for example, when sliding rod 34 is pressed inwards to retract into the sleeve 30, it would push on the push rods 37 and 38 to cause the sliding rods 33 and 35 located 90 degrees to the sliding rod 34 to extend outwards of the sleeves 29 and 31 respectively. The outward extension of the sliding rods 33 and 35 would in turn pull on the push rods 36 and 39 to cause the sliding rods 32 and 34 to also retract into the sleeves 28 and 30 respectively. Four guiding rollers 40, 41, 42 and 43 are located within the rotary shaft 26 to facilitate the secure and smooth operation of the push rods 36, 37, 38 and 39 respectively.

A pivotal lever 44 is mounted to the handle 14 by a pin 45 in a cantilever manner. A torsion spring 46 is also mounted to the pin 45. The torsion spring 46 maintains the lever 44 in a normally outward angular position relative to the handle 14, and the lever 44 may be operated against the resilient force of the torsion spring 46 by gripping it by hand to lie close to the handle 14. It will return to the outward angular position when the grip is released. One end of an elongated cable 47 is connected to the lever 44. The cable 47 extends through the hollow channel 20 of support column 12 into the interior compartment 18 of the pulley housing 16 through the opening 22.

The cable 47 is wound through a plurality of pulley assembly 48. For simplicity of illustration, two pulleys 49 and 50 are shown in the pulley assembly as representative. It will be appreciated by those skilled in the art that more than two pulleys may be provided. The cable 47 extends through opening 21 and downward through the hollow channel 19 of support column 11 to connect to a ratchet drive gear mechanism located in the drive gear housing 24. Two guiding rollers 51 and 52 are provided in the interior compartment 18 adjacent to the openings 22 and 21 respectively to lead the cable 47 through the pulley housing 16. Thus, when the lever 44 is operated to pull and release the cable 47 in a reciprocative manner it would cause the ratchet gear mechanism to rotate the drive shaft 26 to drive the cross-shaped wheels 27. The ratchet geat mechanism provides the mechanical advantage for the operation such that only a light gripping action is required to operate the lever 44 to rotate the rotary shaft 26 for transporting a heavy load mounted to the dolly. Additional gearing arrangement may also be provided in the drive gear to provide further mechanical advantage.

Figure 5:
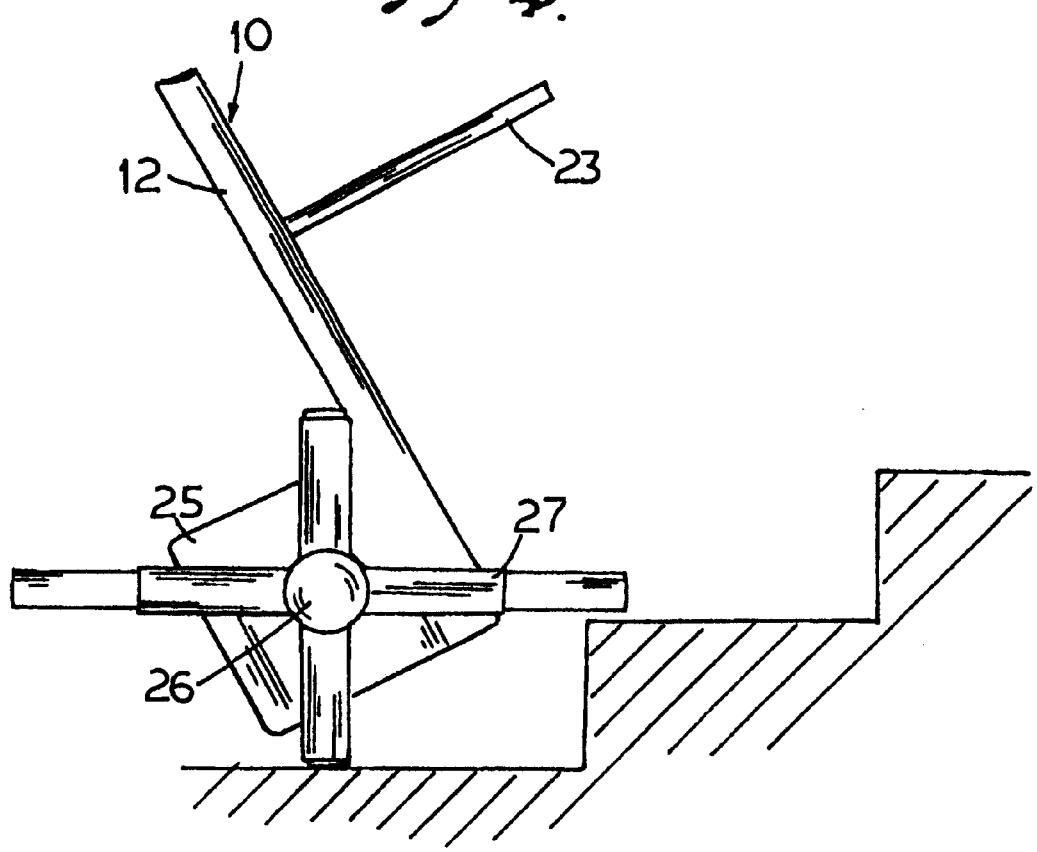
FIG. 5 is a side elevation view showing the operation of the dolly of the present invention on a staircase.

In operation, as best shown in FIG. 5, the dolly 10 climbs the steps by operating the lever 40 to rotate the cross-shaped wheels 27 mounted on the rotary shaft 26. When the first sliding rod of the cross-shaped wheels is pressing down on the first step, it would cause the next sliding rod located 90 degrees from it to extend outwards from its sleeve to contact the next step. Thus, when the cross-shaped wheels are then rotated it would raise the dolly to the next step. Particularly, in the descending operation, the extended next sliding rod would contact the lower step to prevent the dolly from dropping onto the next lower step. The operation continues until the dolly is moved to the top of the staircase or down to its bottom. The extensible rods also facilitate the device to be operated in various staircases having steps of different heights and depths. Furthermore, since no wheels are provided at the outer end of the sliding rods of the cross-shaped wheel, the dolly would not roll down the steps due to its downward momentum. Accordingly, the dolly may be operated in a controlled manner to transport the heavy load up or down the staircase by a relatively light gripping action of the lever 44.

While the present invention has been shown and described in the preferred embodiment thereof, it will be apparent that various modifications can be made therein without departing from the essential attributes thereof, for example, the cross-shaped wheels with the sliding reciprocative rods may have other application than that shown, and it is desired therefore that only such limitations be placed thereon as are imposed by the appended claim.

What I claim is:

1. A portable load transporting dolly comprising,
    a frame having two mutually parallel vertical hollow support columns,
    a horizontal hollow rotary shaft located at a lower portion of said support columns,
    a lever mounted in a cantilever manner to a handle portion of one of said support columns,
    an elongated cable coupled to said lever and to said rotary shaft, said lever being pivotally operative for pulling said cable for rotating said rotary shaft,
    a plurality of cross-shaped wheels mounted on said rotary shaft, said cross-shaped wheels having a plurality of sleeve members extending perpendicular to said rotary shaft, and neighboring sleeve members being positioned at 90 degrees from one another,
    sliding rod members slidably mounted within said sleeve members, and push rod members coupled to an inner end of neighboring sliding rod members whereby a reciprocative action of any sliding rod member causes a reverse reciprocative action in said neighboring sliding rod members.

2. A portable load transporting dolly according to claim 1 including at least one cross brace and a horizontal load supporting shelf provided between said support columns.

3. A portable load transporting dolly according to claim 2 including a pulley system located between said support columns, said cable being coupled to said rotary shaft through said pulley system.

4. A portable dolly operative manually for transporting a load selectively up or down steps of a staircase, comprising
    a frame having two mutually parallel vertical hollow support columns having two handle portions at a top portion therein extending rearwardly and upwardly,
    a lever mounted in a cantilever manner to one of said handle portions,
    a hollow rotary drive shaft rotatably mounted horizontally to a lower portion of said support columns,
    an elongated cable wound through a pulley system provided between said support columns and being connected to said lever and coupled to said rotary shaft, said lever being operative for pulling said cable to rotate said rotary shaft,
    a plurality of cross-shaped wheels mounted on said rotary drive shaft, each one of said cross-shaped wheels having four sleeve members connected to said rotary drive shaft in a perpendicular manner, and each one of said sleeve members having a sliding rod member slidably mounted therein,
    push rod members connected between inner ends of neighboring sliding rod members whereby when a sliding rod member in any one of said sleeve members is pushed to a retracted position, said push rod members cause neighboring sliding rod members to extend outwards from sleeve members of said neighboring sliding rod members.

5. A portable dolly according to claim 4 wherein said pulley system is located in an enclosed compartment provided between said support columns.

6. A portable dolly according to claim 5 wherein said cable extends through support column of said one of said handle portions into said enclosed compartment to wind through said pulley system, and guide rollers adapted in said enclosed compartment for leading said cable through said pulley system.

* * * * *